United States Patent Office 3,365,302
Patented Jan. 23, 1968

3,365,302
PROCESS FOR ELUCIDATING AND STABILIZING THE NATURAL PIGMENT IN SHRIMP HYPODERMIS
John V. Vilutis, Chicago, Ill., assignor to Consolidated Foods Corporation, Chicago, Ill., a corporation of Maryland
No Drawing. Continuation-in-part of application Ser. No. 400,947, Oct. 1, 1964. This application Aug. 2, 1966, Ser. No. 569,583
15 Claims. (Cl. 99—111)

ABSTRACT OF THE DISCLOSURE

A process for improving the natural pink color of raw shrimp by contacting peeled raw shrimp with a solution containing hydrochloric acid at about ambient temperatures and below.

This is a continuation-in-part of application Ser. No. 400,947, filed Oct. 1, 1964, now abondoned.

This invention relates to treatment of shrimp, and in particular is directed to improving the natural color and appearance thereof.

Shrimp may be classified according to color. Generally speaking, all kinds of shrimp are found in nature differing by the shade of their shells: pink, brown, and white. The pink shrimp are found in deep water; the brown and white shrimp are found in shallow water.

All types of shrimp have in their shells, epidermis and hypodermis the same pigmentary carotenoid substance known as astaxanthin. This astaxanthin is developed by natural processes to the best degree in the pink shrimp. Brown shrimp develop this astaxanthin better than the white shrimp, but not as well as the pink shrimp. White shrimp have developed this substance to the minimum degree, and not as well as the brown and pink shrimp.

Pink shrimp have the greatest consumer appeal. Pink shrimp therefore are the most desired of the three colors.

It is an object of the present invention to change the appearance of brown and white shrimp to pink shrimp. It is another object of the invention to improve the appearance of the pink shrimp. It is yet another object of the invention to bring out in shrimp astaxanthin the best appearance. It is yet another object of the invention to sterilize the shrimp by killing the virus and bacteria on its surface. It is still another object of the invention to reduce spoilage.

Briefly stated, the present invention relates to the discovery that the foregoing objects may be achieved by treating shrimp with an acid solution for a short period of time. During this period, a significant change occurs. The brown and white shrimp develop a pink appearance, while the pink shrimp take on a fuller color.

The acid may be employed in a pH range from 0.1 to 3.0. The acid treatment may be at ambient temperatures, although for some purposes lower temperatures may be preferred.

Following the acid treatment, the shrimp may be washed to remove any acid residue. Alternatively, and preferably, the shrimp may be treated with a base such as an alkali, for example a solution of sodium carbonate or sodium bicarbonate, in order to neutralize traces of acid, desirably to pH of 6.8 to 6.9, which is the natural pH of shrimp.

The solution used to treat the shrimp according to the present invention contains an acid to reduce the pH. The inorganic mineral acids have been found to be effective. The inorganic mineral acids which have been found to bring out the natural color of shrimp include hydrochloric, sulphuric, or phosphoric acid. It should be understood, however, that these acids are not equally effective, and some work better than others in the process. Special preference is given to hydrochloric acid.

It has been found that ascorbic acid admixed with hydrochloric acid is especially effective in the process. The ascorbic acid acts as a reaction stimulator and a stabilizer of the pigment.

Generally speaking, the inorganic acid may be present in the solution from about 0.1 percent to 3.0 percent, preferably from about 0.2 percent to about 0.5 percent by weight, and the ascorbic acid in admixture therewith may be present from about 0.005 percent to about 2.5 percent by weight, preferably about 0.01 percent by weight. A mixture of hydrochloric and ascorbic acid in a ratio of 10:1 is preferred. A solution of 0.1 N hydrochloric acid and 0.01 N ascorbic acid has been found satisfactory. For most purposes, the acid solution is maintained at a pH from about 0.7 to about 3.0, and most desirably from about 1.0 to about 1.5.

The process is conducted at temperatures preferably in the range from ambient temperature and lower, and to as low as freezing at about 32° F., and most desirably from about 35° F. to about 40° F.

The time required for treatment is from about one second to about sixty seconds, and usually about fifteen to thirty seconds. In most cases it will be found desirable to keep the time of treatment to as short a period as possible, in order to prevent changes in the quality or texture of the product.

The shrimp to be treated by the process may include any of the three types of shrimp: pink, brown, or white. The shrimp is first shelled and de-veined. The method is applicable to raw, uncooked shrimp. The color change is produced by merely contacting the shrimp with an acid solution.

Other modes of applying the principles of the invention may be employed, change being made as regards the details described, provided the features stated in any of the following claims or the equivalent of such be employed.

I, therefore, particularly point out and distinctly claim as my invention:

1. The process of improving the natural color and appearance of uncooked shrimp which comprises the steps of contacting peeled raw uncooked shrimp in the temperature range of about ambient temperatures and below with at least one solution containing hydrochloric acid having a pH in the range from 0.1 to 3 and for a period of time sufficient to improve the natural pink color.

2. The process of claim 1 in which the said solution containing hydrochloric acid has a pH in the range from 0.7 to 3.0.

3. The process of claim 1 in which the pH of said solution containing hydrochloric acid is from about 1.0 to about 1.5.

4. The process of claim 1 in which said hydrochloric acid is admixed with ascorbic acid.

5. The process of claim 1 in which said shrimp is selected from the class consisting of brown and white shrimp.

6. The method of improving the natural color and appearance of uncooked shrimp which comprises the steps of contacting peeled raw uncooked shrimp in the temperature range of about ambient temperatures and below with a solution containing hydrochloric acid in a pH range from 0.1 to 3 and for a period of time sufficient to improve the natural pink color, and then treating said shrimp to remove said acid solution.

7. The process of claim 6 in which said acid solution has a pH in the range from 0.7 to 3.0.

8. The process of claim 6 in which said acid solution has a pH from about 1.0 to about 1.5.

9. The process of claim 6 in which said hydrochloric acid is admixed with ascorbic acid.

10. The process of claim 9 in which said acid solution has a pH from 0.7 to 3.0.

11. The process of claim 6 in which said shrimp is contacted with acid solution for less than about sixty seconds.

12. The method of improving the natural color and appearance of uncooked shrimp which comprises the steps of contacting peeled raw, uncooked shrimp in the temperature range of about ambient temperatures and below with an acid solution containing at least one mineral acid admixed with ascorbic acid in a pH range from 0.1 to 3 and for a time sufficient to improve the natural pink color.

13. The method of claim 12 in which said mineral acid is hydrochloric acid.

14. The method of claim 12 in which said acid solution is in the pH range from about 0.7 to about 3.0.

15. The method of claim 12 in which said acid solution contains a mixture of hydrochloric and ascorbic acids.

References Cited

UNITED STATES PATENTS

| 1,046,991 | 12/1912 | Danilevsky | 99—160 |
| 2,669,520 | 2/1954 | Fellers | 99—160 |
| 3,222,186 | 12/1965 | D'Aquin | 99—111 |

FOREIGN PATENTS

| 926,453 | 5/1963 | Great Britain. |

OTHER REFERENCES

Faulkner et al: Food Technology, December 1965, pp. 632 to 635.

Landgraf, R. G.: Food Technology, vol. 10, No. 12, December 1956, pp. 607 to 610.

LIONEL M. SHAPIRO, *Primary Examiner.*

UNITED STATES PATENT OFFICE
CERTIFICATE OF CORRECTION

Patent No. 3,365,302                          January 23, 1968

John V. Vilutis

It is hereby certified that error appears in the above numbered patent requiring correction and that the said Letters Patent should read as corrected below.

Column 4, line 14, for "December 1965" read -- December 1955 --.

Signed and sealed this 18th day of March 1969.

(SEAL)
Attest:

Edward M. Fletcher, Jr.                      EDWARD J. BRENNER

Attesting Officer                           Commissioner of Patents